Figure 1:
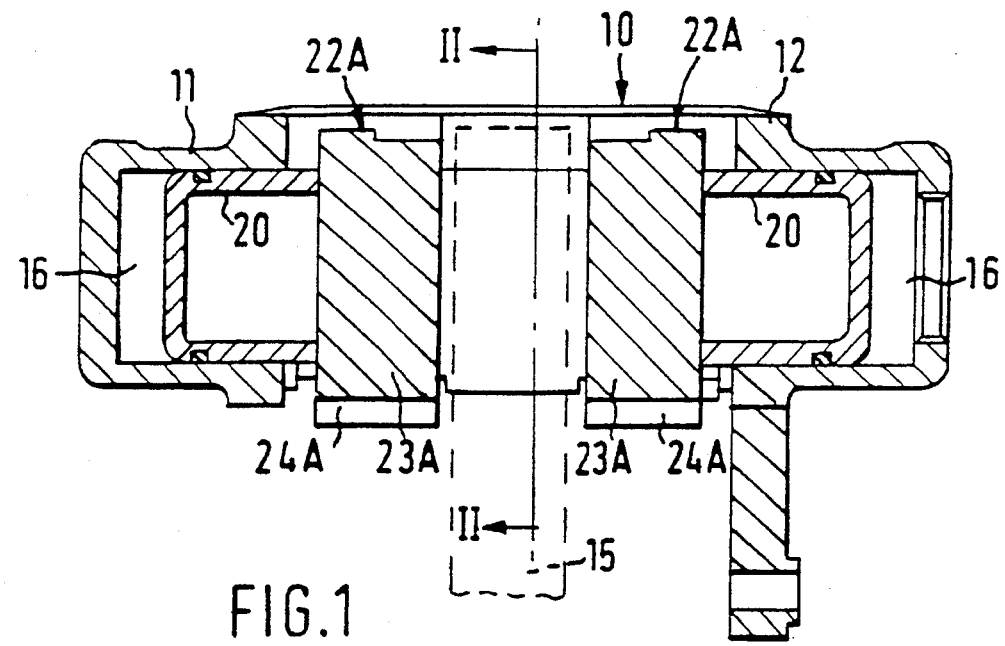

United States Patent [19]

Bryan et al.

[11] Patent Number: 5,477,944

[45] Date of Patent: Dec. 26, 1995

[54] BRAKE CALIPER WITH PLURAL CYLINDERS AND FRICTION PADS

[75] Inventors: Stephen Bryan, Middleton Cheney; Robert Tyler, Cubbington, both of Great Britain

[73] Assignee: Automotive Products, plc, Leamington Spa, England

[21] Appl. No.: 232,143

[22] PCT Filed: Aug. 20, 1993

[86] PCT No.: PCT/GB93/01775

§ 371 Date: May 5, 1994

§ 102(e) Date: May 5, 1994

[87] PCT Pub. No.: WO94/07049

PCT Pub. Date: Mar. 31, 1994

[30] Foreign Application Priority Data

Sep. 11, 1992 [GB]  United Kingdom .................. 9219298

[51] Int. Cl.[6] ................................. F16D 55/228
[52] U.S. Cl. ................. 188/72.5; 188/250 B; 188/250 G
[58] Field of Search ................................. 188/71.5, 72.4, 188/72.5, 72.6, 73.1, 73.2, 250 B, 250 G, 250 E, 369, 217; 192/107 R, 107 M

[56] References Cited

U.S. PATENT DOCUMENTS

| | | | |
|---|---|---|---|
| 3,602,328 | 8/1971 | Fannin et al. | 188/72.5 |
| 3,923,128 | 12/1975 | Lucien et al. | 188/250 B X |
| 4,090,591 | 5/1978 | Pollinger et al. | 188/73.1 |
| 4,093,043 | 6/1978 | Smith | 188/72.5 X |
| 4,535,874 | 8/1985 | Pollinger et al. | 188/250 G X |

FOREIGN PATENT DOCUMENTS

| | | |
|---|---|---|
| 0061107 | 9/1982 | European Pat. Off. . |
| 0480366 | 4/1992 | European Pat. Off. . |
| 2355207 | 1/1978 | France . |
| 1138028 | 12/1968 | United Kingdom . |
| 1179377 | 1/1970 | United Kingdom . |

Primary Examiner—David M. Mitchell
Assistant Examiner—Lee W. Young
Attorney, Agent, or Firm—Paul E. Milliken; Lee A. Germain

[57] ABSTRACT

A disc brake caliper has two limbs which, in use, straddle an outer periphery of a brake disc to support friction pads on each side of the disc. Each caliper limb supports at least two friction pads arranged side by side in a circumferentially sequential array with the trailing edges of each pad abutting the leading edge of any circumferentially adjacent pad in the array to transmit torque loads from one pad to the adjacent pad.

16 Claims, 1 Drawing Sheet

BRAKE CALIPER WITH PLURAL CYLINDERS AND FRICTION PADS

This invention relates to disc brakes for motor vehicles and in particular but not exclusively to disc brakes for high performance cars or motor cycles.

In a typical disc brake, a brake caliper straddles the outer peripheral margin of a brake disc, the caliper having at least one hydraulic cylinder therein for applying friction pads to each side of the disc. The calipers are of two basic types, fixed calipers which have hydraulic cylinders on both sides of the disc, and moving calipers in which typically the hydraulic cylinder(s) is on one side of the disc for direct application of friction pad(s) on that side of the disc, and the friction pads on the other side of the disc are applied by the reaction movement of the caliper.

With disc brakes of tile type fitted to high performance vehicles particularly racing cars or motor cycles the friction pads are extended over a relatively long arc to maximise the area of friction material in contact with the disc. When the brakes are applied, the leading edge of the pads tends to "grab" onto the disc and in the extreme conditions which these brakes operate, the leading edges and areas of the pads wear faster than the trailing areas.

Also due to the arcuate length of the pads, as the pads heat up during braking they tend to buckle due to internal expansion causing heat spotting of the friction material followed by material fade.

One way of compensating for the uneven wear has been to provide a plurality of hydraulic cylinders in the caliper, with the cylinders at the leading areas of the pad being of a smaller diameter than the cylinders at the trailing areas of the pad so that the leading edge area of the pad is applied to the disc by a smaller load than the trailing edge areas.

It is an object of the present invention to provide a disc brake caliper which mitigates the above problems.

Thus according to the present invention there is provided a disc brake caliper having two limbs which in use straddle an outer periphery of a brake disc to support friction pads on each side of the disc, characterised in that each caliper limb supports at least two friction pads arranged side by side in a circumferentially sequential array with the trailing edge of each pad abutting the leading edge of any circumferentially adjacent pad in the array to transmit torque loads from one pad to the adjacent pad.

Preferably the adjacent abutting trailing and leading edges of the pads have interlocking portions which prevent circumferentially adjacent pads from relative radial movement.

Figure 2:
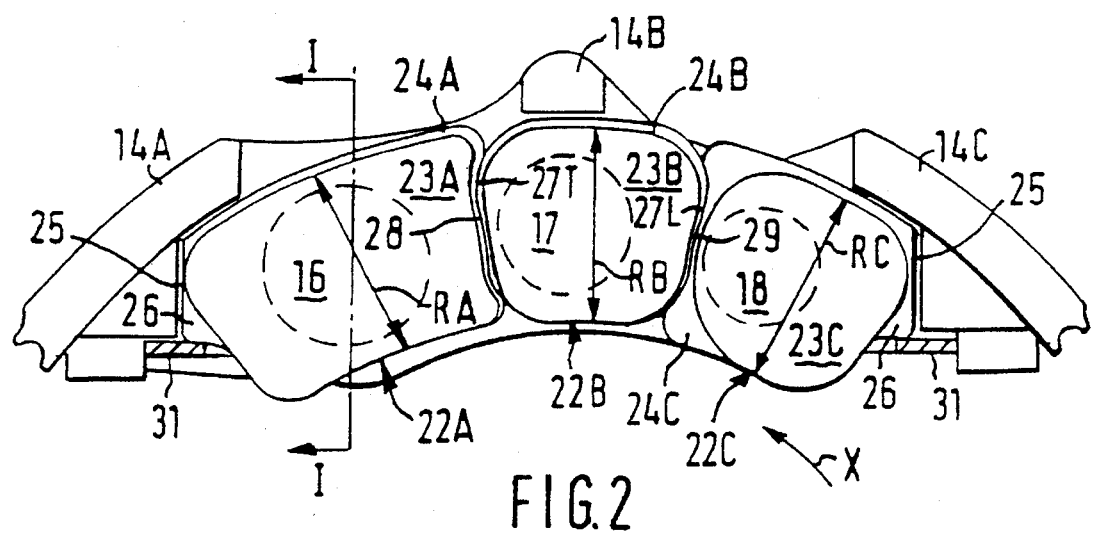

The invention will be described by way of example and with reference to the accompanying drawings in which:

FIG. 1 is a cross-section through a disc brake calliper according to the present invention, taken on the line I—I of FIG. 2, and FIG. 2 is a section on the II—II of FIG. 1.

With reference to FIG. 1 and FIG. 2 there is illustrated a disc brake caliper 10 for a racing car and which comprises two limbs 11, 12 interconnected by three spaced bridge portions 14A,14B,14C. In use the caliper straddles the outer periphery of a brake disc 15 (shown in dotted outline) with a limb located on each side of the disc. One limb 12 is connected in use to the torque reaction member e.g. a stub axle to which the braking loads are transferred.

The two limbs 11 and 12 each have three hydraulic cylinder assemblies 16,17,18, circumferentially spaced across the caliper body (that is circumferentially with respect to the disc) so that the cylinder assemblies 16, 17, 18 in one limb 11 oppose the cylinder assemblies in the other limb 12. The cylinders each contain pistons 20 which thrust friction pads 22A, 22B and 22C against the opposed surfaces of the disc.

In the example shown each pad 22A, 22B, 22C is of a one piece so-called carbon/carbon construction (i.e. carbon fibre in a carbon matrix) machined to provide a braking or friction material portion 23A, 23B, 23C and a larger backing plate portion 24A, 24B, 24C. It will be appreciated that each pad may alternatively comprise friction material bonded to a separate backing plate which will typically be steel.

The pads are supported on the caliper body 11 in a circumferentially sequential arcuate array with the backing plate portion 24 of the two end pads 22A and 22C each having a lug 26 thereon with an abutment surface 25 for abutment against the calliper body 11, 12 during braking. The center pad 22B is held between the two end pads 22A and 22C by the leading and trailing edges 27L, 27T of its braking plate portion interlocking with the adjacent leading edge 28 of the adjacent pad 22A and the trailing edge 29 of the adjacent pad 22C. These edges are interlocked through serpentine curves, but other interlocking shapes could be used. It will be noted that the radial extent RA,RB,RC of each pad of the array is substantially the same so that each pad sweeps substantially the same annular contact area on the disc.

Thus any braking loads are transmitted to the caliper circumferentially through the three pads of each array via the abutting interlocking edges 27L,27T,28,29. The middle pads 22B in each array are held against radially inward movement by the two outer pads 22A and 22C which are in turn secured against radially inward movement by plates 31, and all the pads are held against radially outward movement by the caliper body.

The frictional material areas of the pads 22A to 22C increase from the leading pad 22C to the trailing pad 22A (the terms "leading" and "trailing" refer to the pads when used for braking forward motion of the vehicle, indicated by arrow X in FIG. 2, the "leading" pad being the first pad which the disc meets as it rotates). Similarly the hydraulic cylinder diameter also increase from the leading cylinder assembly 18 to the trailing cylinder assembly 16.

This increase in friction material area and cylinder diameter helps, in addition to promoting even pad wear, to compensate for the increased heat built up (and hence loss in braking effect) at the pad/disc interface when moving from the leading to the trailing pad.

Because the pads 22A to 22C in each limb 11 and 12 are formed individually this provides three pad leading edges and since the tendency is for pad leading edges to "grab" the disc, then the total braking capacity of the brake caliper is increased because of the increased number of pad leading edges. Furthermore since each pad has a leading edge then all three pads tend to wear at the same rate.

Also, with carbon/carbon pads there is a tendency for carbon dust to collect on the brake disc 15 where its presence between the pads and disc reduces braking efficiency. Such dust collection on the disc is cleaned off during use of the brake by the leading edges of pads. The provision of a number of separate pads in each array each with its own leading edge improves this cleaning effect. Further, since the long arcuate pad area is now divided over three separate pads instead of a single pad the tendency to buckling and heat spotting is reduced.

Although the invention has been described above as applied to a six pad, six cylinder type caliper, it can be used for other designs such as a four cylinder, four pad caliper, or a six cylinder four pad caliper, and may be used on sliding or swinging calipers.

Also, since the "grab effect" is spread between a number of separate pads in each array, the invention could be used with the pads in each array of equal friction material area and with each pad operated by a cylinder of the same diameter.

We claim:

1. A disc brake caliper having two limbs which in use straddle an outer periphery of a brake disc to support friction pads on each side of the disc, each limb including a plurality of hydraulic cylinder assemblies, and supporting at least two friction pads arranged side by side in a circumferentially sequential array with the trailing edge of each pad abutting the leading edge of any circumferentially adjacent pad in the array to transmit torque loads from one pad to the adjacent pad, and each friction pad having at least one corresponding hydraulic cylinder assembly for pushing the respective friction pad independently against the disc.

2. A disc brake caliper as claimed in claim 1 in which each caliper limb supports three friction pads arranged in a circumferentially sequential arcuate array.

3. A disc brake caliper as claimed in claim 2 in which the friction pads each comprise a friction material portion and a backing plate portion wherein adjacent trailing and leading edges of the backing plate portions are in abutment, and the adjacent friction material portions are spaced from each other.

4. A disc brake caliper as claimed in claim 2 in which the abutting adjacent trailing edges of the pads have interlocking portions.

5. A disc brake caliper as claimed in claim 1 in which each limb of the caliper has a plurality of hydraulic cylinder assemblies (16,17,18) therein, there being one cylinder assembly for each friction pad for pushing the respective friction pad against the disc.

6. A disc brake caliper as claimed in claim 5 in which the friction pads each comprise a friction material portion and a backing plate portion wherein adjacent trailing and leading edges of the backing plate portions are in abutment, and the adjacent friction material portions are spaced from each other.

7. A disc brake caliper as claimed in claim 5 in which the abutting adjacent trailing edges of the pads have interlocking portions.

8. A disc brake caliper as claimed in claim 1 wherein the disc contact areas of the friction material portions of the pads and the cross section areas of the hydraulic cylinder assemblies increase from the leading pads to the trailing pads.

9. A disc brake caliper as claimed in claim 8 in which the friction pads each comprise a friction material portion and a backing plate portion wherein adjacent trailing and leading edges of the backing plate portions are in abutment, and the adjacent friction material portions are spaced from each other.

10. A disc brake caliper as claimed in claim 8 in which the abutting adjacent trailing edges of the pads have interlocking portions.

11. A disc brake caliper as claimed in claim 1 in which the friction pads each comprise a friction material portion and a backing plate portion (24A,24B,24C), wherein adjacent trailing and leading edges of the backing plate portions are in abutment, and the adjacent friction material portions are spaced from each other.

12. A disc brake caliper as claimed in claim 11 in which the abutting adjacent trailing edges of the pads have interlocking portions.

13. A disc brake caliper as claimed in claim 1 in which the abutting adjacent trailing edges of the pads have interlocking portions.

14. A disc brake caliper as claimed in claim 13 in which the interlocking portions are of a serpentine form.

15. A disc brake caliper having two limbs which in use straddle an outer periphery of a rotatable brake disc to support friction pads for contact with each side of the disc, each limb including a plurality of hydraulic cylinder assemblies, and supporting at least two friction pads arranged side by side in a circumferentially sequential array with the trailing edge of each pad abutting the leading edge of any circumferentially adjacent pad in the array to transmit torque loads from one pad to the adjacent pad, and the areas of the pads which contact the disc and the cross section areas of the hydraulic cylinder assemblies increasing from a leading pad to a trailing pad considering the pads relative to an intended forward direction of rotation of the disc.

16. A disc brake caliper having two limbs which, in use, straddle an outer periphery of a brake disc to support friction pads on each side of the disc, each limb including a plurality of cylinder assemblies to exert axial pressure against the pads, each limb of said caliper supporting at least two friction pads arranged side by side in a circumferentially sequential array with the trailing edge of each pad abutting the leading edge of any circumferentially adjacent pad in th array to transmit torque loads from one pad to the adjacent pad, and the abutting adjacent trailing and leading edges of the pads have interlocking portions to prevent relative radial movement between abutting pads and between the pads and the brake caliper but permitting relative independent axial movement of each pad with respect to any adjacent pad due to pressure independently exerted on each pad by at least one of the hydraulic cylinder assemblies.

* * * * *